United States Patent [19]

Bibler et al.

[11] Patent Number: 5,441,991
[45] Date of Patent: Aug. 15, 1995

[54] CESIUM-SPECIFIC PHENOLIC ION EXCHANGE RESIN

[75] Inventors: Jane P. Bibler; Richard M. Wallace, both of Aiken, S.C.

[73] Assignee: The United States of America as represented by the United States Department of Energy, Washington, D.C.

[21] Appl. No.: 963,965

[22] Filed: Oct. 21, 1992

Related U.S. Application Data

[63] Continuation of Ser. No. 800,735, Dec. 3, 1991, abandoned, which is a continuation of Ser. No. 460,480, Jan. 3, 1990, abandoned.

[51] Int. Cl.$^6$ .................... A61K 33/00; A61K 31/775
[52] U.S. Cl. .................................................... 521/35
[58] Field of Search .......................................... 521/35

[56] References Cited

U.S. PATENT DOCUMENTS

2,692,865 10/1954 Harris ..................................... 521/35
4,423,159 12/1983 Ebra et al. ............................. 521/35

FOREIGN PATENT DOCUMENTS

805322 12/1958 United Kingdom .................. 521/35

Primary Examiner—Thurman K. Page
Assistant Examiner—P. Webber
Attorney, Agent, or Firm—Brian R. Tumm; Harold M. Dixon; William R. Moser

[57] ABSTRACT

A phenolic, cesium-specific, cation exchange resin is prepared by neutralizing resorcinol with potassium hydroxide, condensing/polymerizing the resulting intermediate with formaldehyde, heat-curing the resulting polymer to effect cross-linking and grinding it to desired particle size for use. This resin will selectively and efficiently adsorb cesium ions in the presence of a high concentration of sodium ions with a low carbon to cesium ratio.

18 Claims, 1 Drawing Sheet

CESIUM-SPECIFIC PHENOLIC ION EXCHANGE RESIN

The U.S. government has rights in this invention pursuant to Contract No. DE-AC09- 76SR0001 between the U.S. Department of Energy and E.I. Dupont de Nemours & Co.

This is a continuation of application Ser. No. 07/800,735, filed Dec. 3, 1991, which is a continuation of Ser. No. 07/460,480, filed on Jan. 3, 1990, both now abandoned.

BACKGROUND OF THE INVENTION

1. Field of the Invention

The present invention relates to ion exchange resins, more particularly cation exchange resins, and to the process for preparing these resins.

2. Discussion of Background

Ion exchange resins are organic compounds: they are rigid, 3-dimensional polymers in which the polymeric chains are held together by cross-linking groups. This type of resin contains positively and/or negatively charged moieties fixed to the polymer. Associated with each of these fixed charges is an ion of opposite charge that is free to exchange with ions of similar charge in a surrounding solution.

Radioactive cesium-137 is a long-lived fission product found in wastes produced by reprocessing fuels from nuclear reactors. The bulk of this isotope is found in the high-activity waste, but smaller amounts are also found in other waste streams such as the overheads from waste evaporators and the water from fuel cooling basins.

When acidic, high-activity wastes from reprocessing plants are neutralized, as they are in some defense reprocessing plants, insoluble sludges precipitate that contain most of the fission products. There remains, however, a very large volume of soluble material, called the supernate, which is composed principally of sodium nitrate and sodium hydroxide and which contains virtually all of the cesium.

One approach to the ultimate management of such high-activity waste is to remove the cesium from the supernate, combine it with the sludge, and convert them both to glass by vitrification in a joule heated melter. Several cesium-specific phenolic resins, including "DUOLITE CS-100", a trademark of Rohm and Haas, Inc., and another disclosed in U.S. Pat. No. 4,423,159, have been proposed for removal of cesium from supernate. The amounts of these materials required to decontaminate the supernate adequately are too large to be fed directly to the melter. Excessive amounts of organic matter will reduce some of the constituents of the sludge to the metallic state, which in turn will cause an electrical short circuit in the melter. There is thus a need for a more efficient cesium-specific ion exchange resin that will decontaminate the supernate adequately but will not introduce excessive amounts of organic matter into the melter.

SUMMARY OF THE INVENTION

In accordance with its major aspects, the ion exchange resin of the present invention consists essentially of a meta-dihydroxybenzene condensed with an aldehyde under base-catalysis, then heat-cured. The base-catalyzed condensation forms and polymerizes the monomer, which is then further cross-linked by heat-curing. The hardened resin is then ground into particles of an appropriate size for use.

The resin of the present invention absorbs 10 times more cesium than currently available resins, even in the presence of a high concentration of sodium ions. Its lower carbon to cesium ratio allows it to be vitrified without causing an electrical short circuit in the melter.

The present invention will be fully appreciated by reference to the following detailed description of a preferred embodiment of the present invention.

DETAILED DESCRIPTION OF THE INVENTION

Figure 1:
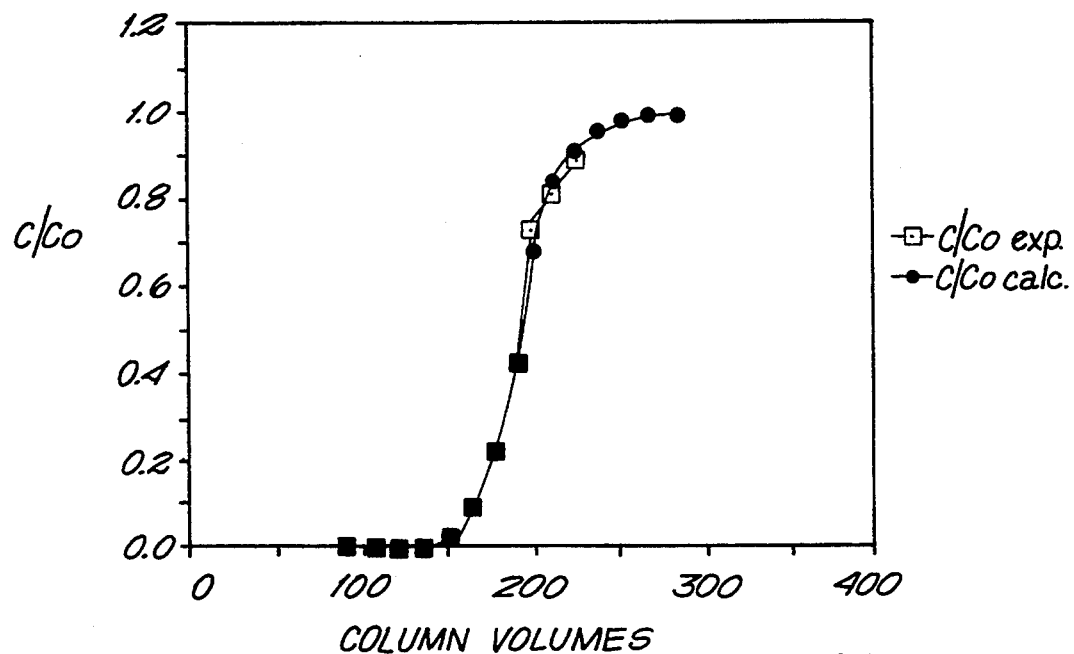
FIG. 1 is a graph of the ratio of final to initial cesium activity versus the ratio of simulated waste volume to resin volume.

The present invention is an ion exchange resin specific for cesium even in the presence of a high concentration of sodium ions, which are frequently encountered in high concentrations in alkaline wastes such as nuclear wastes. A measure of the efficiency of an ion exchange resin is the number of "bed volumes" of waste that can be treated by a quantity (a bed or column) of the resin before the concentration of the ion of interest in the effluent is half that in the feed. The volume of aqueous waste can be divided by the volume of the resin column to yield a number of bed volumes or column volumes. The higher the number of bed or column volumes that can be processed, the more efficient the resin. The resin of the present invention can achieve 225 bed volumes of aqueous solution at 50% breakthrough (the maximum capacity of the resin). This is approximately 10 times the efficiency of other currently-available resins. It also exhibits radiolytic stability, with no loss of specificity after $1 \times 10^7$ rads.

Preparation of this resin involves a short reaction sequence. First, one neutralizes a meta-dihydroxybenzene, namely resorcinol, with an equimolar amount of an appropriate base, preferably potassium hydroxide (KOH). Neutralization takes place within a reasonable time at a temperature at or above room temperature, but preferably approximately 90 degrees C., until complete, and preferably for at least 1 hour. Total curing time up to approximately 16 hours is required for a gel and drive off excess $H_2CO$ and $H_2O$.

The neutralized meta-dihydroxybenzene is then cooled to room temperature, for the condensation/polymerization with an aldehyde, preferably formaldehyde, and most preferably a 37% aqueous solution of formaldehyde. Condensation and polymerization are essentially complete upon addition of the aldehyde, as indicated by the formation of a dark purple gel.

Cross-linking is accomplished by heat-curing. The dark purple gel is heated to a temperature of 100–115 degrees C., preferably 100 degrees C., for at most 16 hours. The cross-linking is complete after 1 hour, but further heating is required to drive off the excess formaldehyde and water. The heat-cured product is a cross-linked, dark purple resin.

To use this ion-exchange resin, the heat-cured resin is ground and sieved to an appropriate mesh. Appropriate sizes include 20–50, 40–60, 60–80, and 80–100 mesh.

The selectivity, efficiency, and radiolytic stability of the ion exchange resin will determine the scope of possible uses. The selectivity of the ion exchange resin of the present invention was determined by evaluating the distribution coefficient, $K_d$. The distribution coefficient can be calculated using the equation:

$$K_d = V/g * [(C_o/C) - 1],$$

where V is the volume of the solution in milliliters, g is the mass of resin in grams, C is the cesium activity of the solution at equilibrium, and $C_o$ is the initial activity. The initial and final activities, proportional to the cesium ion concentration, were determined by gamma counting. Hence, the removal of a large percentage of the initial cesium ion concentration will be represented by a high $K_d$. The efficiency of this resin was determined by evaluating the ratio $C/C_o$ as a function of the number of column volumes passed through the ion exchange column. The radiolytic stability of this resin was determined by subjecting it to various levels of g aroma radiation in a Cobalt-60 source before use and then evaluating its performance.

While not wishing to be bound by theory, it is believed that the unexpectedly high cesium selectivity and efficiency are linked to the deprotonation of a meta-dihydroxybenzene with a base of sufficient strength having a $K^+$ counterion. The two hydroxyl groups of this compound are available for deprotonation and hence for ion exchange. The $K^+$ counterion of the base becomes the counterion of the deprotonated hydroxyl, thus templating the polymer; that is, before the polymer cross-links into a rigid, 3-dimensional form, a $K^+$-sized space is created at the site of every deprotonation. Since $Cs^+$ and $K^+$ are approximately the same size (ionic radius $Cs^+ = 1.67$ angstroms; ionic radius $K^+ = 1.33$ angstroms), the ion exchange resin has been templated for cations that are approximately the same size as $K^+$.

The invention will be further clarified by consideration of the following examples, which are intended to be purely exemplary of the use of the invention.

Example 1: Synthesis

Sixty-six grams ($6 \times 10^{-1}$ mole) of resorcinol were mixed in a hood with 100 mL of 6M KOH ($6 \times 10^{-1}$ mole) and 500 mL of deionized water in a large, covered Petri dish. The stirred mixture was maintained at 90 degrees C. for one hour. The resulting solution was cooled to room temperature before 175 mL of 37% formaldehyde solution (2.2 moles) were added with stirring. Some heat evolved during this step. The uncovered solution in the Petri dish was transferred to a vented oven located in a hood. The oven and solution were maintained at 100 degrees C. overnight to effect curing of the resin. A minimum time of one hour at 100 degrees C. appeared to be necessary for adequate cross-linking of the resulting resin. After that, removal of water and excess formaldehyde took place. When dry, the resin was mechanically ground and then sized using a series of sieves.

Example 2: Selectivity (Distribution Coefficients)

Table 1 lists some representative distribution coefficients ($K_d$) that were measured in solutions containing 4.5M $NaNO_3$ and 1.5M NaOH with varying amounts of cesium. Coefficients were also measured with a simulated supernate solution whose composition is given in Table 2. The distribution coefficients are seen to vary with the cesium ion concentration in a sensitive manner. This behavior is characteristic of phenolic resins.

TABLE 1

DISTRIBUTION COEFFICIENTS FOR CESIUM

| Solution | Initial Cs Molarity | Equilibrium Cs Molarity | $K_d$, mL/g |
|---|---|---|---|
| $NaNO_3$, NaOH | app.1 × $10^{-8}$ | app.3 × $10^{-10}$ | 5.45 × $10^3$ |
| $NaNO_3$, NaOH | 2.00 × $10^{-4}$ | 8.06 × $10^{-6}$ | 3.57 × $10^3$ |
| $NaNO_3$, NaOH | 2.00 × $10^{-3}$ | 6.32 × $10^{-4}$ | 3.25 × $10^2$ |
| Simulated Supernate | 2.50 × $10^{-4}$ | 8.24 × $10^{-6}$ | 4.40 × $10^3$ |

Cesium distribution coefficients were determined as follows: Weighed samples of air-dried, sodium-form resin (about 0.1 grams) were placed in 30-mL polyethylene bottles together with 15 mL of solutions containing Cs-137 tracer, nonradioactive Cs, and other components. The bottles were shaken overnight (approximately 16 hours). The Cs activity in the solution after equilibration, was then compared with the initial activity. The distribution coefficients, Kd, were calculated using the equation given above.

The cesium concentrations at equilibrium [Cs] were calculated from the formula:

$$[Cs] = [Cs]_o(C/C_o)$$

where $[Cs]_o$ is the initial concentration of cesium.

TABLE 2

COMPONENTS OF SIMULATED SUPERNATE

| Chemical | Grams/Liter | Molarity |
|---|---|---|
| NaOH | 116.0 | 2.9 |
| $Al(NO_3)_3 \cdot 9H_2O$ | 142.6 | 0.38 |
| $NaNO_3$ | 101.2 | 1.2 |
| $NaNO_2$ | 49.0 | 0.71 |
| $Na_2CO_3 \cdot H_2O$ | 24.8 | 0.20 |
| $Na_2SO_4$ | 24.0 | 0.17 |
| $KNO_3$ | 1.52 | 0.015 |
| $CsNO_3$ | 0.049 | 2.4 × $10^{-4}$ |
| Cs-137 | | trace |
| Total $[Na^+]$ = 5.6 M | | |

Example 3: Efficiency (Column Volumes)

The distribution data above showed that the resin was highly selective for cesium and could efficiently remove it from certain radioactive waste solutions. Two column tests were run using the resin of the present invention to determine its efficiency. One test involved simulated supernate while a second was performed with actual supernate. In both cases, the ratio $C/C_o$ was determined as a function of the number of column volumes (CV) passed through the column, where C is the cesium activity at any instant an d $C_o$ is the initial activity.

I. Column Run With Simulated Supernate

A 2.0 mL column of air-dried resorcinol resin in the sodium form was prepared by slurrying the resin with 2.0M NaOH. Simulated supernate was prepared as noted in Table 2.

Four hundred eighty milliliters (240 column volumes) of simulated supernate were processed by the column in downflow mode at a flow rate of 6 mL per hour (3 column volumes per hour). Effluent from the column was collected in 6 mL fractions; every fifth fraction was analyzed for Cs-137 by g aroma counting at 661.5 KeV. The results of this test are shown in FIG. 1.

II. Actual Waste Column Run

Two ten milliliter columns of the sodium form of the resin were prepared in 2M NaOH and connected in series. Four liters of salt solution from a tank containing actual waste were used as feed to the columns. The analyses of interest for the salt solution are found in Table 3. To check the hydraulics of the system, 100 mL of 2M NaOH were pumped through the columns at a flow rate of 40 mL/hr. The feed line was then transferred to the salt solution which was also processed at 40 mL/hr (2 column volumes/hr for the system as a whole). Effluent samples, each comprising about 22 mL, were collected at 30 minute intervals. Three milliliter samples from each fraction were taken, transferred to a counting vial, and sent for gamma counting at 661.5 KeV. When the concentration of cesium became too great, samples were diluted with deionized water before being sent for analysis.

Figure 2:
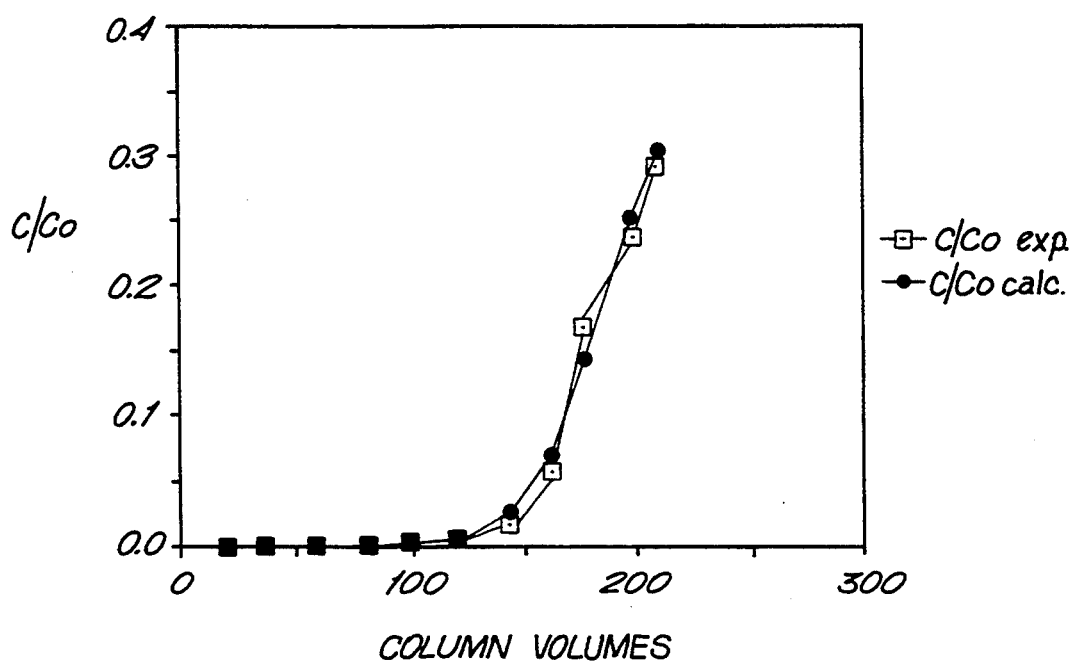
FIG. 2 is a graph of the ratio of final to initial cesium activity versus the ratio of actual waste volume to resin volume.

As the column run continued, a white solid material (possibly aluminum hydroxide) collected on the surface of the resin, which may account for differences between this run and that with simulated feed. The results are shown in FIG. 2.

TABLE 3

| SALT SOLUTION ANALYSES | |
|---|---|
| $[Na^+] = 4.9$ M | $[NO_3^-] = 2.6$ M |
| $[K^+] = 378$ ppm (g/ml) $= 0.0097$ M | $[NO_2^-] = 0.97$ M |
| Cs-137 $= 1.24 \times 10^{-3}$ Ci/mL | $[SO_4^{2-}] = 0.04$ M |
| $= 2.8 \times 10^9$ dpm/mL | |
| Cs-134 $= 7.12 \times 10^{-5}$ Ci/mL | |
| $= 1.6 \times 10^8$ dpm/mL | |

Example 4: Radiolytic Stability

A 1.5 g sample of the sodium form of the resin was placed under deionized water and subjected to gamma radiation from a Co-60 source. The resin was taken out of the source at several intervals and air-dried overnight. Then, 0.01 g samples of the dry resin were shaken overnight with 15 mL of a solution containing 4.5M NaNO$_3$, 1.5M NaOH, $2.0 \times 10^{-4}$M CsNO$_3$, and a trace of Cs-137. Distribution constants, $K_d$'s, were calculated to determine any change in the ability of the resin to adsorb cesium as a result of radiolysis. The remaining air-dried resin was placed under deionized water before returning it to the Co-60 source. The results in Table 4 show no significant loss in capacity below $1.0 \times 10^7$ rad.

TABLE 4

| THE CHANGE IN $K_d$ WITH INCREASED RADIATION EXPOSURE | |
|---|---|
| DOSE, rad | $K_d$, mL/g |
| 0 | $3.46 \times 10^3$ |
| $2.0 \times 10^6$ | $2.17 \times 10^3$ |
| $8.6 \times 10^6$ | $0.78 \times 10^3$ |
| $1.4 \times 10^7$ | $7.38 \times 10^2$ |
| $2.4 \times 10^7$ | $4.68 \times 10^2$ |

Example 5: Comparison of Resins Made with Different Bases

Although the resin can be prepared by neutralizing resorcinol with the hydroxide of any element, the cesium selectivity depends on the particular hydroxide used. Table 5 shows a comparison of resins produced by neutralization with sodium and potassium hydroxides. In this comparison, distribution coefficients ($K_d$) were measured for the two resins with four different solutions. Three of the solutions contained 4.5M sodium nitrate and 1.5M sodium hydroxide together with trace cesium-137 and varying amounts of nonradioactive cesium; the other solution was simulated supernate whose composition is defined in Table 2. In all cases, the distribution coefficients of the resin prepared with potassium hydroxide are higher. A resin was also prepared using cesium hydroxide; but the distribution coefficients were not measured with this resin because a successful method has not yet been developed to remove easily the cesium incorporated during preparation.

TABLE 5

| COMPARISON OF RESINS MADE WITH DIFFERENT BASES | | | |
|---|---|---|---|
| | | $K_d$'s | |
| Solution | Initial Cs Concentration | NaOH | KOH |
| NaOH—NaNO$_3$ | Trace | 4090 | 5450 |
| NaOH—NaNO$_3$ | $2 \times 10^{-4}$ M | 1020 | 3750 |
| NaOH—NaNO$_3$ | $2 \times 10^{-3}$ M | 208 | 325 |
| Simulated Supernate | $2 \times 10^{-4}$ M | 1500 | 4400 |

Example 6: Removal of Cesium from Dilute Wastes

The resorcinol resin can be used to remove cesium from waste streams that contain low concentrations of sodium or cesium ions, such as the overheads from waste evaporators. A 0.01M NaNO$_3$ solution containing trace amounts of cesium-137 was used to simulate evaporator overheads. Portions of this solution were adjusted to various pH values between 8.03 and 10.16. Fifteen-milliliter portions of each of these solutions were equilibrated with approximately 0.01 grams of the resin in the sodium form. In each case, the pH of the resulting solution was approximately 9.95, and the $K_d$ was approximately $2 \times 10^5$. These results show that cesium could be removed from large volumes of evaporator overheads with only a small amount of resin.

Another dilute stream encountered in nuclear fuel reprocessing contains 0.1M NaNO$_3$, 0.01M NaOH, and trace concentrations of cesium-137 (app. 1.5 micro Ci/mL). When 16,000 mL of such a solution was passed through a column containing 2.0 mL of the resorcinol resin, no cesium activity was detected in the effluent.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An improved resorcinol-formaldehyde ion exchange resin provided by:
   neutralizing resorcinol with a base;
   initiating the condensation of said neutralized resorcinol with aqueous formaldehyde under basic conditions;
   continuing said condensation throughout to completion under maintained basic conditions to form a polymer made under basic conditions and having properties from being so made; and,
   heat curing said polymer so made to make said improved ion exchange resin.

2. A method for making an improved resorcinol formaldehyde ion exchange resin comprising the steps of:
   neutralizing resorcinol with a base;

initiating the condensation of said neutralized resorcinol with aqueous formaldehyde in the absence of an acid and under basic conditions to form a polymer; and heat curing said polymer so made to make said improved ion exchange resin.

3. A method for making an ion exchange resin comprising the steps of:

neutralizing resorcinol with an equimolar amount of a base, said base selected from the group consisting essentially of sodium hydroxide and potassium hydroxide;

condensing said neutralized resorcinol with aqueous formaldehyde in the absence of an acid and under basic conditions to form a polymer; and heat curing said polymer so made at a temperature of 100° C.–115° C. for approximately 1–16 hours.

4. The ion exchange resin of claim 1 further provided by grinding and sieving.

5. The resin of claim 1 wherein said base is potassium hydroxide.

6. The resin of claim 4 wherein said base is potassium hydroxide.

7. The resin of claim 1 heat cured at a temperature of approximately 100 degrees Centigrade for approximately one hour to form a gel.

8. The resin of claim 4 heat cured at a temperature of approximately 100 degrees Centigrade for approximately one hour to form a gel.

9. The resin of claim 7 heat cured for up to 16 hours to form a gel and drive off excess $H_2CO$ and $H_2O$.

10. The resin of claim 8 heat cured for up to 16 hours to form a gel and drive off excess $H_2CO$ and $H_2O$.

11. The method of claim 2 further comprising grinding and sieving said resin to increase the surface area of said resin.

12. The method of claim 2 wherein said base is potassium hydroxide.

13. The method of claim 11 wherein said base is potassium hydroxide.

14. The method of claim 2 including the step of heat curing at a temperature of approximately 100 degrees Centigrade for approximately one hour to form a gel.

15. The method of claim 11 including the step of heat curing at a temperature of approximately 100 degrees Centigrade for approximately one hour to form a gel.

16. The method of claim 14 including the step of heat curing at a temperature of approximately 100 degrees Centigrade for up to 16 hours to form a gel and drive off excess $H_2CO$ and $H_2O$.

17. The method of claim 15 including the step of heat curing at a temperature of approximately 100 degrees Centigrade for for up to 16 hours to form a gel and drive off excess $H_2CO$ and $H_2O$.

18. The method as recited in claim 3, wherein said neutralization step is carried out at a temperature of approximately 90° C. for at least one hour, and said method further comprises the step of cooling said neutralized resorcinol to room temperature before said condensation step.

* * * * *